US007020839B1

(12) United States Patent
Hosoda

(10) Patent No.: US 7,020,839 B1
(45) Date of Patent: Mar. 28, 2006

(54) CONTENTS RECEIVING SYSTEM AND CONTENTS RECEIVING METHOD

(75) Inventor: Takashi Hosoda, Kanagawa (JP)

(73) Assignee: Sony Corporation, Tokyo (JP)

( * ) Notice: Subject to any disclaimer, the term of this patent is extended or adjusted under 35 U.S.C. 154(b) by 905 days.

(21) Appl. No.: 09/786,223

(22) PCT Filed: Jul. 3, 2000

(86) PCT No.: PCT/JP00/04395

§ 371 (c)(1),
(2), (4) Date: Apr. 23, 2001

(87) PCT Pub. No.: WO01/03436

PCT Pub. Date: Jan. 11, 2001

(30) Foreign Application Priority Data

Jul. 2, 1999 (JP) .................. 11/188874

(51) Int. Cl.
*G06F 17/00* (2006.01)
(52) U.S. Cl. ...................... 715/523; 707/102
(58) Field of Classification Search ................ 715/513, 715/517, 522, 523; 707/102
See application file for complete search history.

(56) References Cited

U.S. PATENT DOCUMENTS

| 5,860,073 | A | | 1/1999 | Ferrel et al. | |
|---|---|---|---|---|---|
| 5,913,013 | A | | 6/1999 | Abecassis | |
| 6,023,714 | A | * | 2/2000 | Hill et al. | 715/513 |
| 6,463,440 | B1 | * | 10/2002 | Hind et al. | 707/102 |
| 6,589,291 | B1 | * | 7/2003 | Boag et al. | 715/513 |
| 6,668,354 | B1 | * | 12/2003 | Chen et al. | 715/517 |
| 6,757,869 | B1 | * | 6/2004 | Li et al. | 715/513 |
| 6,792,577 | B1 | * | 9/2004 | Kimoto | 715/522 |

FOREIGN PATENT DOCUMENTS

| JP | 9-288677 | 11/1997 |
|---|---|---|
| JP | 9-307564 | 11/1997 |
| JP | 10-269160 | 10/1998 |
| JP | 11-103452 | 4/1999 |

OTHER PUBLICATIONS

Fernandez Panadero M C et al: "Mass-customizing electronic journals" 'ONLINE!, May 10, 1999, pp. 225-235, XP002177409 *paragraph '00031 - paragraph '00041*.

* cited by examiner

*Primary Examiner*—Sanjiv Shah
(74) *Attorney, Agent, or Firm*—Frommer Lawrence & Haug LLP; William S. Frommer

(57) ABSTRACT

A user can select a style sheet applied to an XML document as broadcast program information on a screen. In addition, the user can select display mode/non-display mode of broadcast program information. When the user has selected the display mode, he or she can select link information include mode/link information non-include mode for a menu button. Since a style sheet described in an XSL language or a CSS language is text format data, the use can read it. Thus, the user can edit and update a style sheet through a console. As a result, data in a markup language format can be provided in a representation format corresponding to user's favorite. Thus, the efficiency and flexibility of data delivery are improved.

12 Claims, 15 Drawing Sheets

DISPLAY SCREEN DISPLAYING ONLY BROADCAST PROGRAM MAIN BODY

DISPLAY AREA OF BROADCAST PROGRAM INFORMATION

DISPLAY AREA OF BROADCAST PROGRAM MAIN BODY

DISPLAY SCREEN DISPLAYING BROADCAST PROGRAM MAIN BODY AND PROGRAM INFORMATION (EPG)

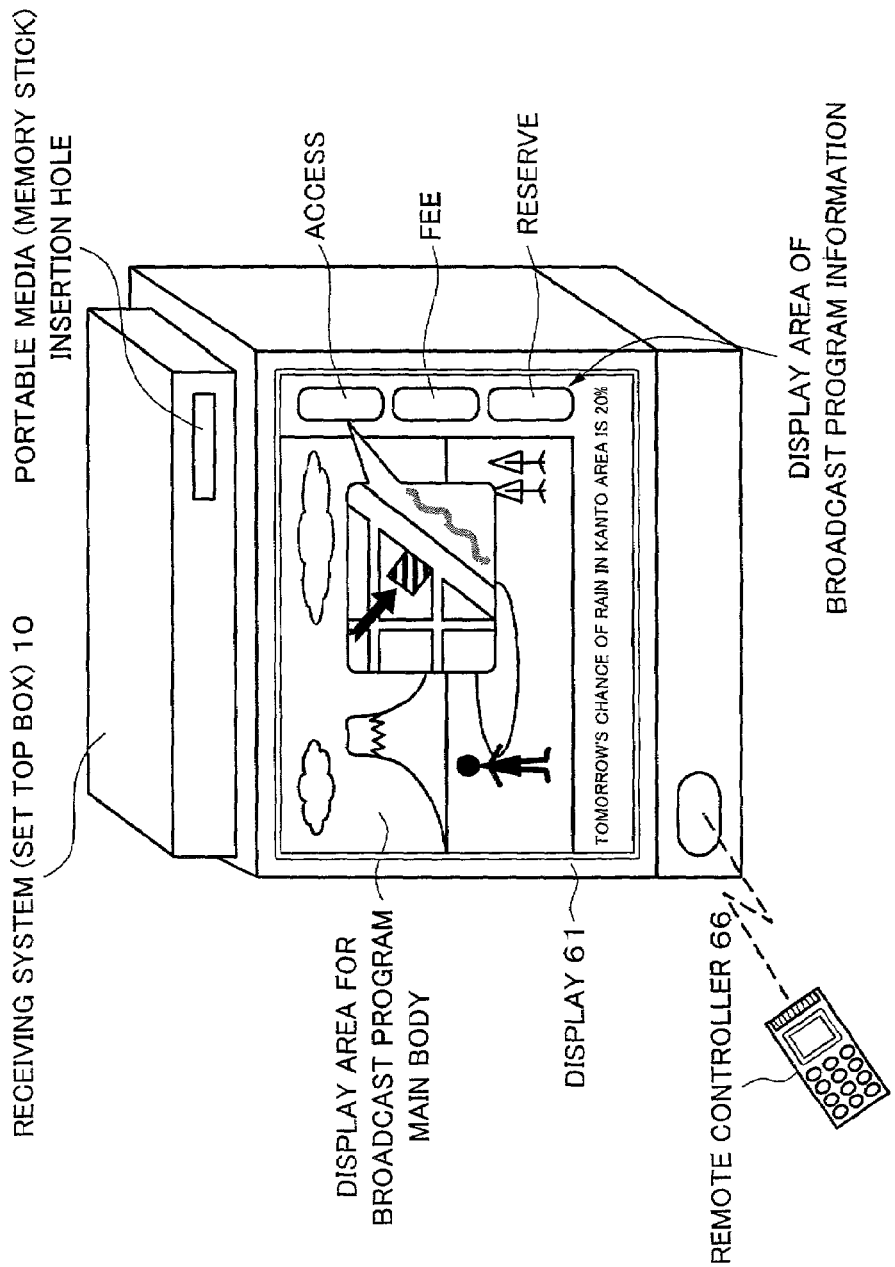

Fig. 13

```
Editor - STYLESHEET.xsl
FILE (F)  EDIT (E)  VIEW (V)  INSERT (I)  FORMAT (O)  TOOL (T)

<?xml version="1.0" encoding="Shift_JIS"?>
<HTML xmlns:xml="http://www.w3.org/TR/WD-xsl"/>
<HEAD>
    <TITLE> AUDIENCE </TITLE>
    <XML id="portfolio">
        <xsl:apply-templates select="AUDIENCE"> <xsl:copy> <xsl:apply-templates select="@*"/>
<xsl-apply-templates?> </xsl:copy> </xsl:apply-template>
        <xsl-apply-templates>
    </XML>
    <XML id="sorted"> <xsl:eval/> </XML>
    <XML id="sortStocks" src="sort.xsl"/> <xsl:eval/> </XML>
</HEAD>
<SCRIPT> <xsl:comment> <![CDATA[
    function sort(field)
    {
        sortField.value=field :
        sorted.XMLDocument. loadXML(portfolio.transformNode(sortStock.XMLDocument));
    }
]]> </xsl:comment> </SCRIPT>
<SCRIPT for="window" event="onload"> <xsl:comment> <![CDATA[
    sortField=sortStocks.selectSingleNode(".//@order-by");
]]> </xsl:comment> </SCRIPT>
<SCRIPT LANGUAGE="JavaScript"> <xsl:comment> <![CDATA[
    function wasClicked () {
//        alert("i was clicked "+window.event.srcElement.innerText);
        var node;
        for (i=0; i<3; i++) {
            if (window.event.srcElement.innerText ==
sorted.documentElement.childNodes.item(i).childBodes.item(2).text){
                break;
            }
```

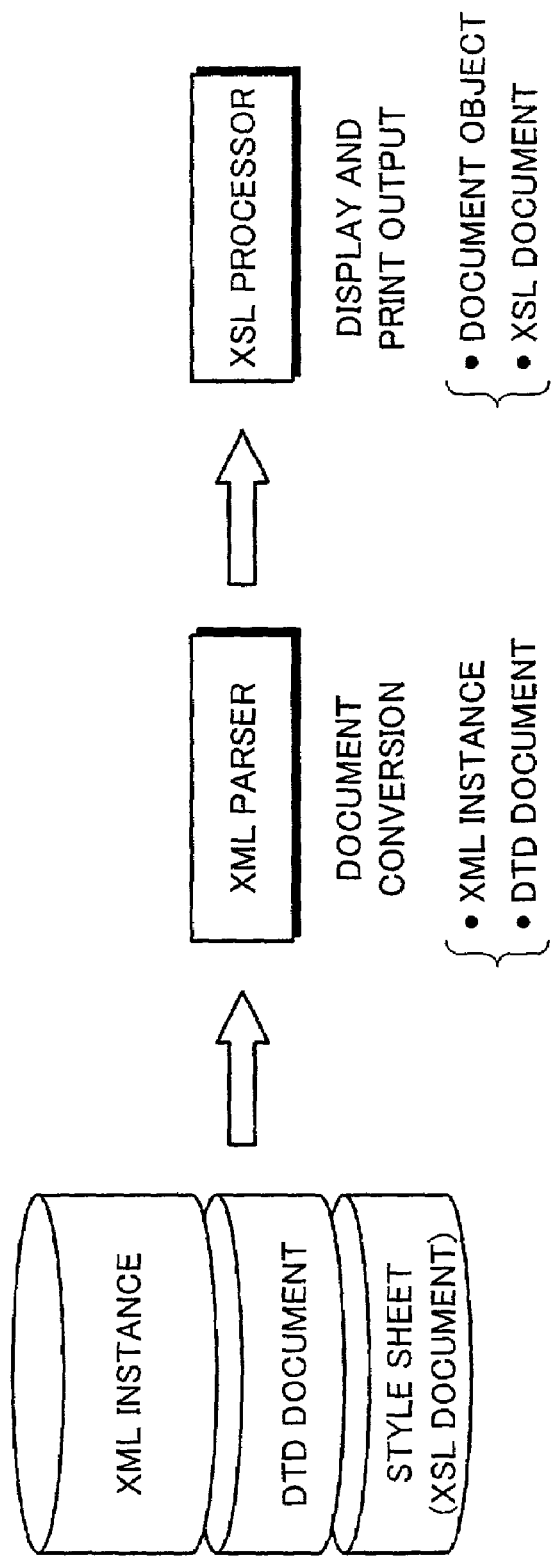

CONTENTS RECEIVING SYSTEM AND CONTENTS RECEIVING METHOD

TECHNICAL FIELD

The present invention relates to a digital data delivering technology for a digital satellite data broadcast and a multimedia contents communication, in particular, relates to a technology for delivering digital data composed of instructions of a computer language having data attributes. Digital data composed of instructions of a computer language having data attributes is described in a language (for example, a markup language) composed of tag data of which data attributes are delimited by tags.

In more details, the present invention relates to a technology for delivering digital data described in a language (for example, XML (extensible Markup Language) using tags that can be freely defined, in particular, relates to a delivery and a use of a style sheet (for example, XSL document described in the XSL (extensible Markup Language) format).

RELATED ART

In the technical field of broadcasting, digitization of data is being performed at rapid pace. This is because the band efficiency of digital data is superior to that of analog data. In addition, digital data can be more highly affiliated with data other than video data and audio data than analog data.

For example, the data amount of digital data transmitted with one channel is equal to the data amount of analog data transmitted with four channels. Thus, high vision data can be transmitted with digital data of one channel. In addition, when various types of system information such as an EPG (Electronic program Guide) are transmitted along with video information and audio information, services for users (audiences) can be improved (the EPG includes functions for representing a broadcast schedule of broadcast programs and program names, for performing a VTR record reservation, and so forth).

Digital data is highly affiliated with information units such as a general purpose computer system as well as a television receiver. For example, a digital satellite data broadcast tuner card is attached to a general purpose computer system. Received EPG data is analyzed by the computer. The analyzed EPG data is displayed on a window of a computer display. As a result, a program selection and a program reservation can be performed using a mouse and a cursor. Of course, broadcast data can be recorded to a built-in hard disk of the computer.

When additional data other than a broadcast program main body of video data and audio data is transmitted using a space of the broadcast band, the interactivity of the broadcast program can be improved. For example, when a broadcast program provides a selection type quiz, if the answer of the quiz is transmitted along with video data and audio data, the satellite television broadcast receiver (namely, audience) side can provide answer menu buttons so that the user can answer the quiz using the mouse and cursor.

When the interactivity is further improved, it can be expected that the home television receiver has not only a function for dealing with video contents, but a function as an information control tower. For example, home television receivers may become an Internet terminal unit and an electronic commerce terminal unit.

In a digital satellite data broadcast, digital transmission data associated with a broadcast program is delivered along with video data and audio data (AV data) that compose a satellite broadcast program main body. In more reality, such digital satellite data is transmitted as a broadcast wave in the format of a "transport stream" (that will be described later in detail). The "transport stream" is composed of AV data that has been compressed corresponding to a particular compression standard such as MPEG2 (Motion Picture Experts Group phase 2) standard and digital transmission data are multiplexed.

An example of broadcast program information placed in digital transmission data is the above-mentioned EPG (Electric Program Guide). The broadcast program information can contain information about a broadcast program main body (such as a title, a date, and a casting). The type and structure of data contained in broadcast program information sometimes depend on service contents of programs. For example, when a broadcast program is a cocking program, the broadcast program information contains information of a menu and fool materials. When a broadcast program is a vote counting report program, the broadcast program information contains votes of candidates that change time by time. When a broadcast program is a live professional baseball program, the broadcast program information contains personal hitting and pitching records of players and team orders.

Broadcast program information is displayed in a part of a display screen that displays a broadcast program on the digital satellite data broadcast receiving system (hereinafter simply referred to as "receiving system"). The receiving system is normally composed of a receiver (set top box (STB) that receives a broadcast wave, turns a program, and decodes the tuned program) and a television receiver (that displays and outputs the decoded program. The receiving system is disposed in the house of the user.

Next, the structure of contents delivered as digital transmission data will be described with reference to FIG. 14 (hereinafter, the contents are referred to as "delivery contents").

As shown in FIG. 14, delivery contents are composed of text data, mono-media data of a still picture, a moving picture, and a sound, and a display-output control program that integrally treats the mono-media data as multimedia data and defines the state of broadcast program information (hereinafter also referred to as "multimedia encoded application"). The display-output control program may contain reference (link) information about each mono-media data.

In the standardizing work for digital satellite data broadcasts, as a multimedia encoding standard for delivery contents, MHEG (Multimedia and Hypermedia Expert Group) was initially considered for use. The MHEG is one type of descriptive languages using tags that define data attributes. With the MHEG. an application of which multimedia contents of a video-on-demand (VOD) or a digital television broadcast are displayed on a television receiver and an audience obtains desired information is expected. For example, in the Japanese CS digital broadcast (SKY Perfect TV), MHEG-5 is used.

However, in the MHEG, since the definitions of tags are fixed, the MHEG does not have an expansibility. In other words, only pre-defined tags should be used. Thus, even if a function (for example, API (Application Programming Interface)) is changed, its correction work becomes heavy. In addition, since the MHEG defines a multimedia encoding standard dedicated for broadcast applications, it does not have a compatibility with contents on the Internet.

To solve such a problem, specifications based on XML (eXtended Markup Language) is being evaluated instead of the MHEG. As well known in the broadcast field, as with HTML (Hyper Text Markup Language), which is a standard descriptive language of the Internet, the XML is a markup descriptive language of which structural elements of contents are delimited with tags that designate attributes thereof. In addition, as with the HTML, the XML allow access information (reference) to another resource object to be placed in contents.

In the XML, tags can be freely defined. In other words, in the XML, since the describing method of attributes is not restricted, the degree of freedom is high. In addition, the XML is highly affiliated with a general purpose computer and the Internet. Those are advantages over the MHEG. In addition, a modification work of the XML as a descriptive language for the next generation Internet is being promoted.

When the XML is used as a standard language for digital satellite data broadcasts, digital broadcast data can be exchanged with various types of information units such as a computer, a television receiver, and a telephone unit. In addition, in the XML, attributes of tags can be freely defined. Thus, data can be more effectively processed with the XML than the HTML that is mainly used for designating a layout. Consequently, the XML is going to be used to various fields including electronic commerce at rapid pace.

In a document described in the XML language (such a document is hereinafter also referred to as "XML instance"), since tags can be freely designated, a character string described in a document can be handled as meaningful data. In other words, when tags are defined, data delimited by tags can be represented as meaningful data other than data that is displayed. In addition, when the structure of tags is defined, an XML instance or part thereof can be described as a structure.

The Japanese digital data broadcast XML standard defines that multimedia data as transmission contents is described using the XML that is a tagged language.

The digital data broadcast XML standard allows tags whose attribute information can be freely defined to be added. A descriptive method for tags that can be freely defined is a rule referred to as DTD (Document Type Definition). The DTD is being standardized in W3C (World Wide Web Consortium). The DTD can be freely defined in each industrial field. Tag attribute information includes information necessary for different types of units that are connected (such as a television receiver and a computer) to understand data of contents and to process the understood data.

An XML instance may not contain style information about a representation format. In such a case, the representation method of the XML instance is described in a "style sheet" that is a document file different from the DTD.

A style sheet is a document file for converting an XML instance into a display screen format (or a printer print format). A style sheet for an XML instance can be described in "XSL" (extensible Stylesheet Language) language, "CSS" (Cascade Style Sheet) Language, or "XSLT" (XSL Transformation) language, which is a derivative of the XSL. Depending on the description of a style sheet, the font, size, and color can be varied. As a result, the same DTD contents can be represented in different formats. A style sheet is transmitted as a file different from the DTD.

An operation of multimedia contents composed of monomedia such as a sound, a still picture, and a moving picture can be defined by a particular language other than the XML and XLS. The language is referred to as script. Such a script is described in a script language (for example, JavaScript, ECMAScript, or Jscript). In standards such as the XML and XSL, ECMAScript is used (ECMAScript is a script language standardized by European Computer Manufacturers Association (ECMA)).

In addition to the original function as a style sheet, the XSL is becoming attractive as an element structure converting language of an XML instance (this standard is under consideration on the filing date of the present invention). In the case that the load of the process of the broadcast digital data package corresponding to the XML standard is heavy or that the receiver cannot be equipped with a hard disk unit, when the XSL is used, a database operation can be performed.

As shown in FIG. 15, delivery contents, which is composed of an XML document, are accompanied by for example a DTD document and a style sheet along with an XML document. An XML document may not be accompanied by a DTD document. Alternatively, a style sheet may be delivered at a timing different from a delivery timing of an XML document. In addition, the descriptive language of delivery contents is not always limited to the XML. Instead, the descriptive language of delivery contents may be another markup language such as SGML (Standard Generalized Markup Language) or HTML. In addition, when an XML document is applied to a television broadcast and used for a presentation along with another real time type data, monomedia location information of a broadcast data module of various types of mono-media contents may be contained in an XML document (hereinafter, the location information is referred to as URI (Uniform Resource Identifier)).

The receiving system side parses a received XML instance with a syntax parsing program referred to as "XML parser". In other words, the XML parser parses the structure of a DTD document and an XML document and outputs a resultant document object. The document object is a structured document whose tree structure is formed with tags of the original XML document.

The document object is converted by a conversion program (the conversion program is referred to as "XSL processor"). The XSL processor converts a document object into a format corresponding to the description of the XSL document.

In addition, when the XSLT (XSL Transformation), which is a derivative standard of the XSL, is applied, a document described in an advanced XML format may be converted into an HTML document that can be browsed by so-called HTML browser. In addition, such a document may be converted into a custom document that can be browsed by a custom browser other than the HTML browser. In other words, with the XSLT, contents can be easily exchanged between applications and/or between information terminal units.

As was described above, broadcast contents of a digital satellite data broadcast are composed of a "transport stream". The "transport stream" is composed of an AV data portion and digital transmission data that are multiplexed. The AV data portion is composed of video information and audio information of a broadcast program main body. The AV has been compressed corresponding to the MPEG2 standard. The digital transmission data is associated with the broadcast program.

As was described above, the broadcast program information is composed of a multimedia encoded application (described in a markup language such as the XML (extensible Markup Language)). When an application is described in the XML, since tags can be freely defined, documents can be structured with tags that represent meanings rather than a display layout. In other words, with the XML, data can be effectively processed.

An XML instance itself does not contain information of a representation format (for example, a display screen format or a printer print output format). Thus, a style sheet that defines a representation format of an XML instance should be delivered to users (namely, audiences of the digital satellite broadcast) along with delivery contents. Alternatively, a style sheet may be delivered to each user in a particular process different from a process for delivering an XML document (for example, a style sheet and an XML document may be delivered at different timings; alternatively, a portable medium such as a CD that stores a style sheet may be distributed or sold). Each user may have a plurality of style sheets for one XML document.

For example, when an XML document designates a style sheet that is applied to an XML instance as broadcast program information, the style sheet selecting operation is automatically performed. Thus, the service against users (namely, audiences) is improved. Alternatively, when a broadcast provider places an instruction in an XML document as delivery contents, since the broadcast provider can designate a screen display format for the audiences, the broadcast provider can centrally control the content of the broadcast service.

On the other hand, since the content of the service is fixed from the viewpoint of users (namely, audiences), the degree of freedom becomes low. In other words, the users (audiences) feel cramped.

As a general screen display format, broadcast program information contains menu buttons such as "record" and "record reserve". Such a menu area occupies a particular area of the display screen. Although the menu buttons provide an advanced functional service, they cause the display area of video information of a broadcast program main body to narrow.

The needs and favorites of audiences vary person by person. Some audiences desire menu buttons, whereas other audiences do not desire menu buttons. Other audiences desire menu buttons, but do not require the operations thereof. Some audiences may desire another type of style sheet that is not contained in broadcast contents.

The present invention is made from such a point of view. An object of the present invention is to accomplish an information delivery that satisfies the needs and favorites of users (audiences) in a digital data delivery such as a digital satellite data broadcast and a multimedia contents communication.

Another object of the present invention is to accomplish an information delivery that satisfies the needs and favorites of users (audiences) in a delivery of digital data composed of instructions having data attributes of a computer language as a markup descriptive language such as XML.

Another object of the present invention is to provide data delivered in a markup language with a digital satellite data broadcast in a representation format that satisfies the needs and favorites of users (audiences).

Another object of the present invention is to provide a technology using a style sheet that satisfies the needs and favorites of users (audiences) against data delivered in a markup language with a digital satellite data broadcast or the like.

DISCLOSURE OF THE INVENTION

The present invention is made from the above-described points of view.

A first aspect of the present invention is a contents receiving system or method for receiving delivery contents composed of instructions of a computer language having data attributes, comprising (steps of):

a means (step) for storing at least one style sheet defining a representation format of delivery contents composed of instructions of a computer language having data attributes;

a means (step) for accepting delivery contents composed of instructions of a computer language having data attributes and/or a style sheet;

a means (step) for prompting a user to select a stored style sheet; and a means (step) for applying the style sheet selected by the user to the delivery contents and displaying the accepted delivery contents.

A second aspect of the present invention is a contents receiving system or method for receiving delivery contents described in a language format using tags, comprising (steps of):

a means (step) for storing at least one style sheet defining a representation format of delivery contents described in a language format using tags;

a means (step) for accepting delivery contents described in a language format using tags and or a style sheet;

a means (step) for prompting a user to select a stored style sheet; and a means (step) for applying the style sheet selected by the user to the delivery contents and displaying the accepted delivery contents.

A third aspect of the present invention is a contents receiving system or method for receiving delivery contents described in a language format using tags that are freely definable, comprising (steps of):

a means (step) for storing at least one style sheet defining a representation format of delivery contents described in a language format using tags that are freely definable;

a means (step) for accepting delivery contents described in a language format using tags that are freely definable and/or a style sheet;

a means (step) for prompting a user to select a stored style sheet; and a means (step) for applying the style sheet selected by the user to delivery contents and displaying the accepted delivery contents.

The style sheet storing means or step may be a medium that is portable and that is attachable and detachable to/from the main body of the contents receiving system.

The user selection prompting means (step) may include a selection menu item that causes delivery contents not to be displayed.

The user selection prompting means (step) may include a selection menu item that causes a style sheet to be edited.

The style sheet may be encrypted. The contents receiving system (method) further comprises (step of):

a means (step) for decrypting an encrypted style sheet.

In the digital satellite data broadcast, a transport stream of which AV data composing a broadcast program main body and broadcast program information such as an electric program guide (EPG) or the like are multiplexed is delivered.

A representation control program of broadcast program information (namely, multimedia encoded application) is a document described in a markup language such as XML. However, since the XML instance does not contain a representation format (namely, a display format on a display screen, a print output format to a printer, and so forth), when it is output to the outside, a style sheet should be applied. The style sheet is described in XSL, CSS, XSLT (as a derivative of XSL), or a script.

As a general screen display format, broadcast program information contains menu buttons such as record and record reserve. Such a menu area occupies a particular area of the display screen. Although the menu buttons provide an advanced functional service, they cause the display area of video information of a broadcast program main body to narrow.

The needs and favorites of audiences vary person by person. Some audiences desire menu buttons, whereas other audiences do not desire menu buttons. Other audiences desire menu buttons, but do not require the operations thereof. Some audiences may desire another type of style sheet that is not contained in broadcast contents.

In the digital satellite data broadcast receiving system according to the present invention, the user (namely, audience) can select a style sheet to which an XML document as broadcast program information is applied on a display screen. In addition, the user can select display mode/non-display mode of broadcast program information and select include mode/non-include mode for link information on menu buttons.

In addition, since a style sheet described in the XSL is text type data, the user can read it. Thus, the receiving system according to the present invention allows the user to edit and update a style sheet through a console.

Thus, according to the present invention, data delivered in a markup language with a digital satellite broadcast or the like can be provided in a representation format that satisfies the needs and favorites of the user (audience). Thus, the efficiency and flexibility of a data delivery can be improved.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 10 is a schematic diagram showing screen information displayed on a display 61, in reality.

FIG. 12 is a schematic diagram showing a screen provided to a user (audience), in reality, a schematic diagram showing a screen operation with a menu button that contains link information.

FIG. 13 is a schematic diagram showing an example of a style sheet editing screen.

FIG. 15 is a schematic diagram showing a process for an XML instance.

BEST MODES FOR CARRYING OUT THE INVENTION

Next, with reference to the accompanying drawings, an embodiment of the present invention will be described.

Figure 1:
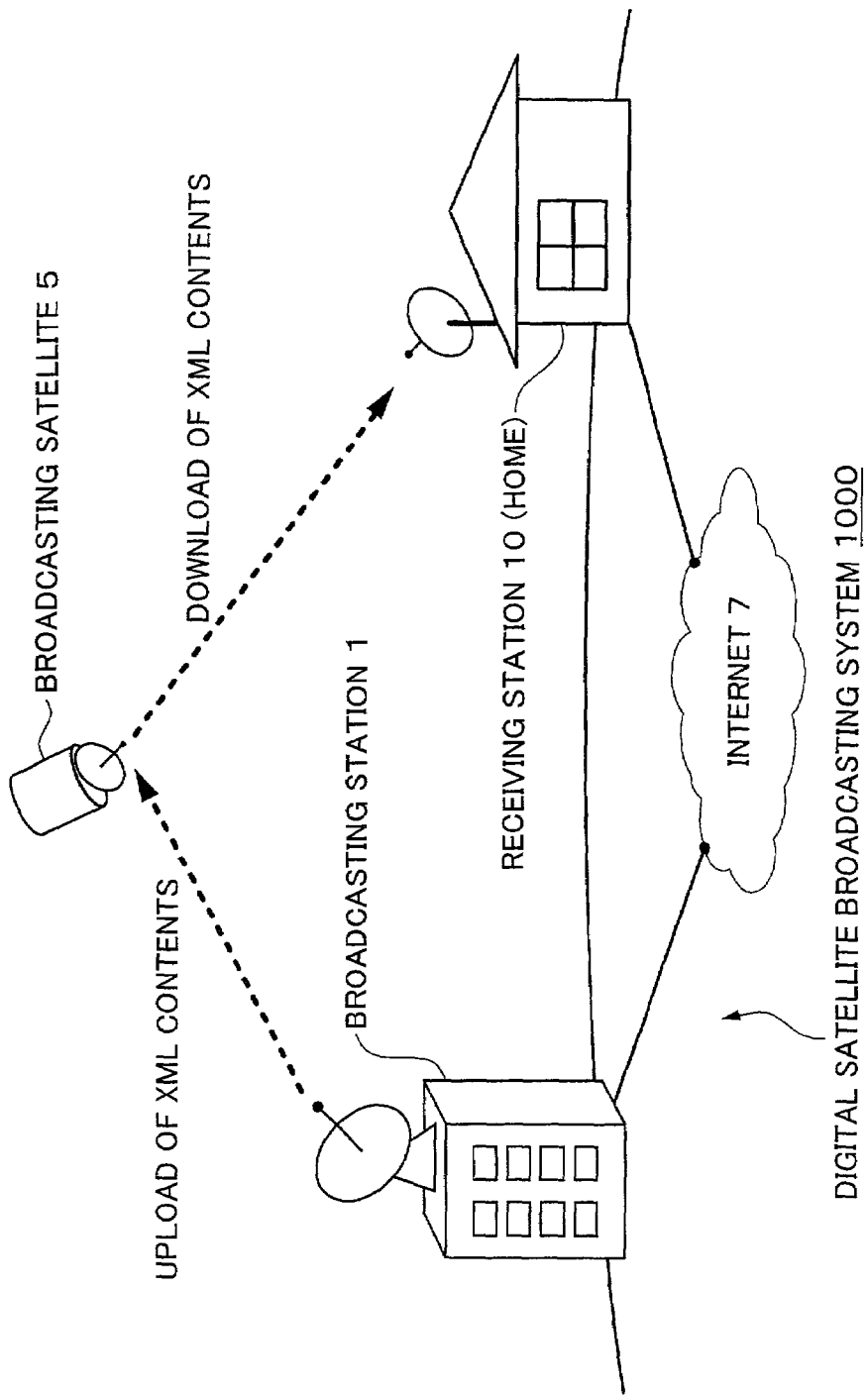
FIG. 1 is a schematic diagram showing an outlined structure of a digital satellite data broadcasting system 1000 according to an embodiment of the present invention.

FIG. 1 shows an outlined structure of a digital satellite data broadcasting system 1000 according to an embodiment of the present invention. As shown in FIG. 1, the digital satellite data broadcasting system 1000 is composed of a broadcasting station (broadcast server) 1, a broadcasting satellite (satellite) 5, and a receiving station (receiver/decoder) 10. The broadcasting station 1 provides a broadcast service. The broadcasting satellite 5 repeats broadcast data. The receiving station 10 receives broadcast data from the broadcasting satellite 5. At least one broadcasting station 1 is disposed on the ground. A plurality of broadcasting satellites 5 are disposed over the earth. An unlimited number of receiving stations 1 are disposed on the ground. A data delivery (namely, a data broadcast) is one-way communication through the broadcasting station 1 and the broadcasting satellite 5.

In a digital data broadcast, data is performed at 10 Mbps to 50 Mbps of transmission rate. The broadcasting station 1 multiplexes AV data (that composes a broadcast program main body) and digital transmission data (that contains program information about a broadcast program). AV data is compressed corresponding to the MPEG2 (Motion Picture Experts Group phase 2) standard and then transmitted.

According to the embodiment of the present invention, digital transmission data is composed of various types of mono-media data (such as a text, a still picture, a moving picture, and a sound) and "multimedia encoded application" (that is a program for controlling the display and output of the mono-media data). The multimedia encoded application is described in the XML (extensible Markup Language) format. The multimedia encoded application contains a DTD document and a style sheet. The DTD document defines the type of the document. The style sheet is described in for example the XSL (however, delivery contents may not contain a DTD document and a style sheet).

Each receiving station 10 and the broadcasting station 1 may be bi-directionally connected through a wide area network 7 such as the Internet or a leased line (not shown). In such a case, the Internet 7 may be used as a upward line of which data is transmitted from the receiving station 10 to the broadcasting station 1. For example, a limited on-demand broadcast service using for example the Internet 7 can be provided. In such a case, it is preferred that the receiving system 10 is connected to the Internet 7 through a high speed analog telephone line of 56 kbps or high, a high speed wireless communication of around 10 kbps to 64 kbps, an ISDN (Integrated Services Digital Network) of 128 kbps, or a cable of 5 Mbps to 30 Mbps.

Figure 2:
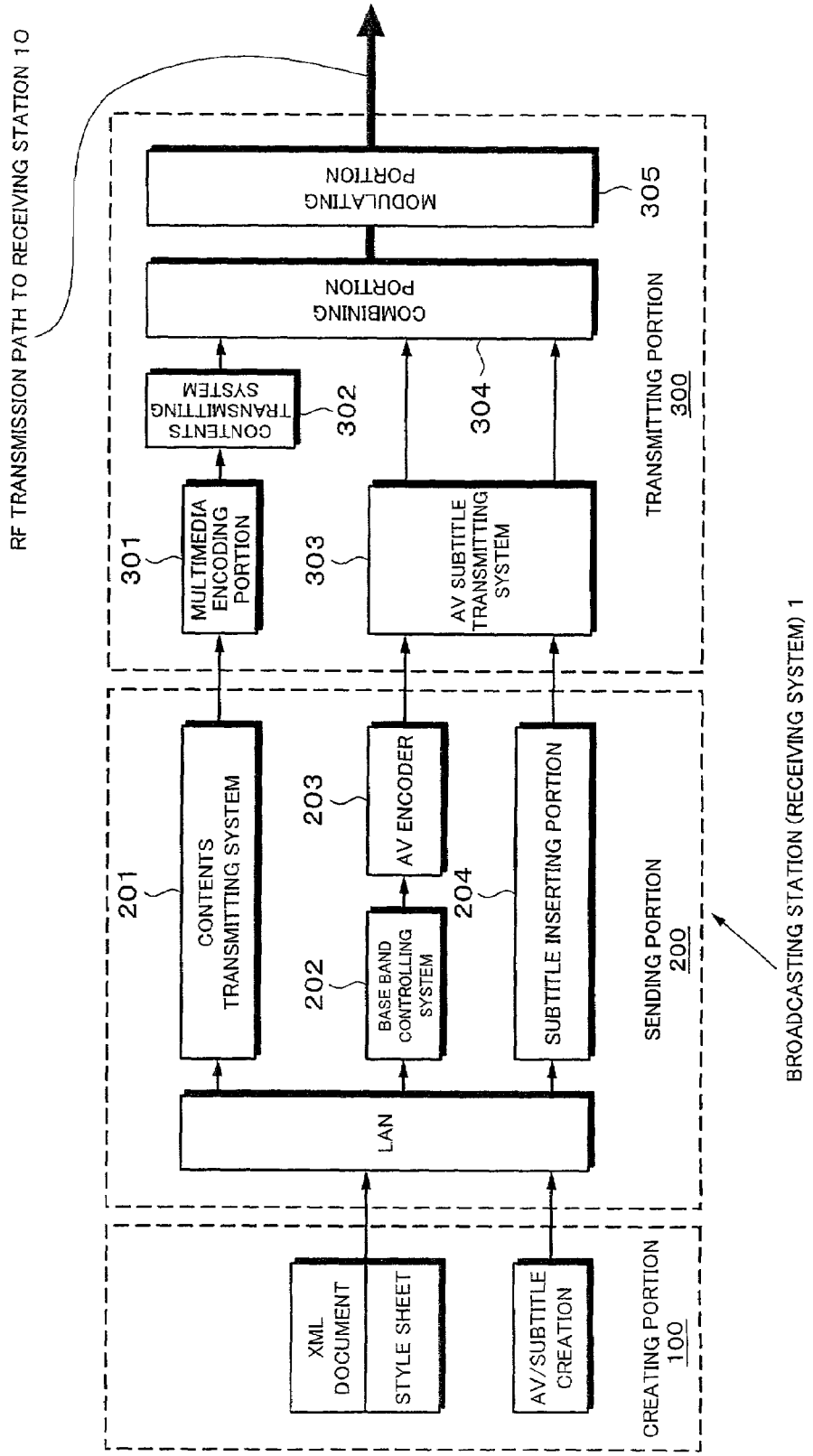
FIG. 2 is a block diagram showing the structure of a broadcasting station 1 (namely, a broadcasting system) that transmits digital transmission data.

FIG. 2 shows the structure of the broadcasting station 1 (namely, transmitting system) that transmits digital transmission data. The broadcasting station 1 is composed of a creating portion 100, a sending portion 200, and a transmitting portion 300. Next, each portion will be successively described.

The creating portion 100 is equivalent to a site that creates individual contents of broadcast program information that is sent as digital transmission data. In other words, the creating portion 100 creates an XML (extensible Markup Language) document (that describes the content of data broadcast), a style sheet (that defines a representation format of the XML document), and various types of mono-media data (such as a still picture, a moving picture, a sound, and a subtitle (text)) (hereinafter, referred to as "AV/subtitle").

An XML document that is a display-output control program of a data broadcast is described in a language using tags that can be freely defined. The XML document is accompanied by a DTD document that defines a document type. The style sheet is a document described in the XSL (extensible Stylesheet Language) format, the CSS (Cascade Style Sheet) format, or the XSLT (XSL Transformation) format that is a derivative of the XSL format. The broadcast contents that are created by the creating portion 100 are transferred to the sending portion 200 through a LAN (Local Area Network) disposed in the broadcasting station 1.

In the sending portion 200, a contents transmitting system 201, a base band controlling system 102, an AV encoder 203, and a subtitle inserting portion 204 packetize the data and send the resultant data to the transmitting portion 300.

In the transmitting portion 300, a multimedia encoding portion 301 encodes delivery contents data (namely, an XML document) and sends the encoded data to a contents transmitting system 302. A combining portion 304 combines output data of the contents transmitting system 302 and the output data of an AV subtitle transmitting system 303. A modulating portion 305 modulates the combined signal with an RF signal and transmits the modulated signal to the receiving stations 10 through an RF transmission path.

On the RF transmission path, the resultant RF signal is transmitted from a transmission antenna disposed in the broadcasting station 1 to the broadcasting satellite 5. Thereafter, the RF signal is received by an reception antenna of the receiving station 10 through the broadcasting satellite 5.

Figure 3:
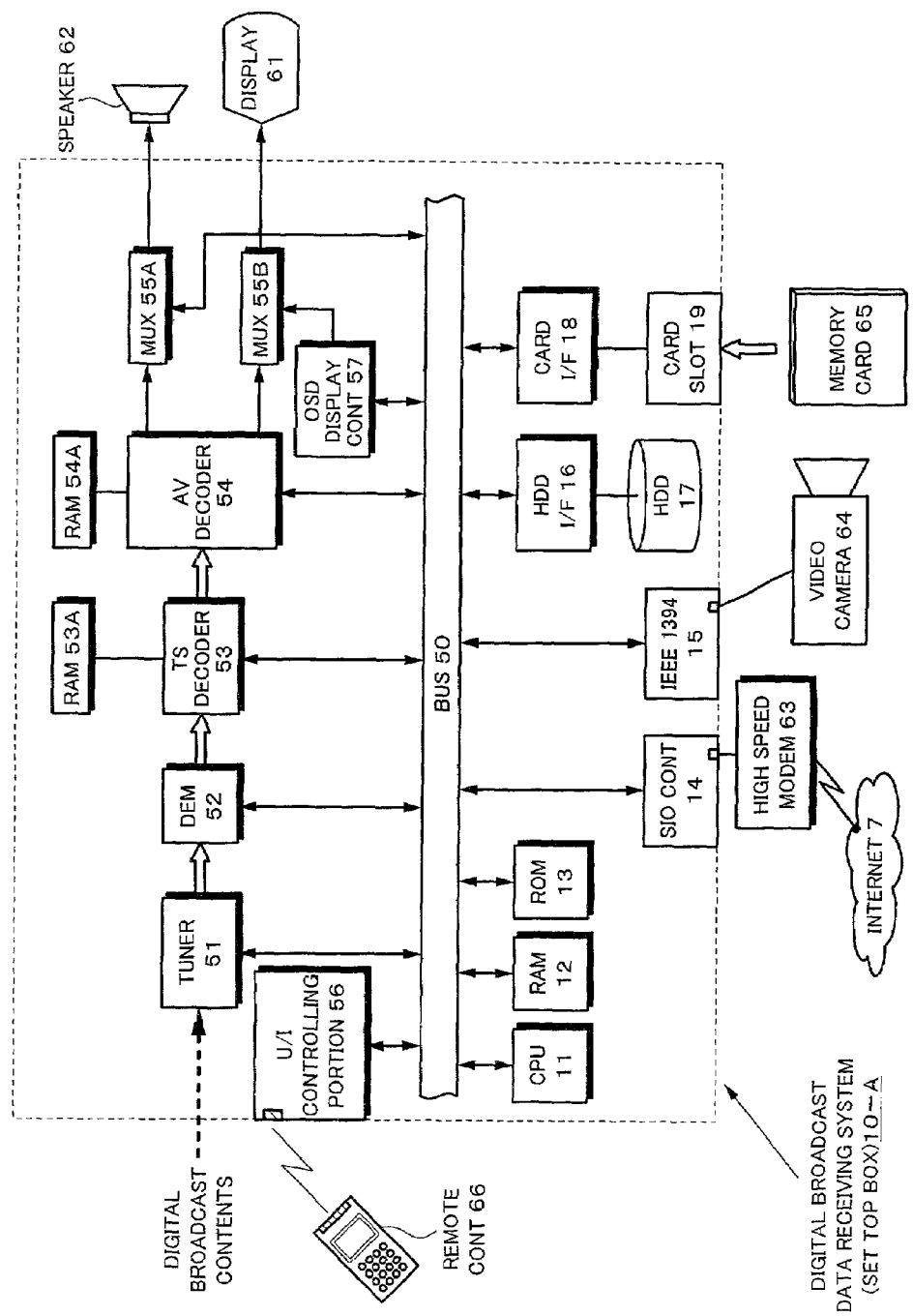
FIG. 3 is a block diagram showing the hardware structure of an example of a receiving system 10-A of a receiving station 10 (namely, in a home), in reality, a block diagram showing the structure of the receiving system 10-A disposed as an STB (Set Top Box).

FIG. 3 is a block diagram showing the hardware structure of an example of a digital satellite data broadcast receiving system 10-A disposed in the receiving station 10. The receiving system 10-A is disposed as for example a STB (Set Top Box) in the home of the user. In the receiving system 10-A, a CPU 11 as a main controller is connected to each hardware component through a bus 50. The CPU 11 executes a total control of each component. Next, each hardware component will be described.

A broadcast wave received by an antenna (not shown) is supplied to a tuner 51. The broadcast wave has a predetermined format. The broadcast wave contains for example program guide information (EPG: Electric Program Guide) and so forth. According to the present invention, the broadcast wave may be a cable broadcast wave or a ground wave.

The tuner 51 tunes the broadcast wave and outputs the tuned data to a demodulator 52 under the control of the CPU 11. The demodulator 52 demodulates the digitally modulated data. Depending on whether the transmitted broadcast wave is an analog signal or a digital signal, the structure of the tuner 11 may be properly changed or expanded.

The demodulated digital data is a "transport stream" of which AV data compressed corresponding to the MPEG2 standard and digital transmission data are multiplexed. The AV data is composed of video information and audio information that compose a broadcast program main body. The digital transmission data is broadcast program information accompanied by the broadcast program main body. The digital transmission data contains for example an EPG (Electric Program Guide). The digital transmission data will be described later. The transport stream is a data format defined in "transport layer" of an OSI (Open System Interconnection) reference model.

A TS decoder 53 interrupts the transport stream and separate it into AV data compressed corresponding to the MPEG2 standard and the digital transmission data. The TS decoder 53 sends the AV data and the digital transmission data to an AV decoder 54 and the CPU 11 through a bus 50, respectively. The TS decoder 53 may contain a memory 53A that stores work data.

When the AV decoder 54 receives the AV data compressed corresponding to the MPEG2 standard from the TS decoder 53, the AV decoder 54 separates the AV data into compressed picture data and compressed audio data, decompresses them, and reproduces the original picture signal and the original audio signal. The AV decoder 54 may contain a memory 54A that stores work data. The reproduced picture signal is displayed and output to a display 61 through a multiplexer 55B. The reproduced audio signal is output to a speaker 62 through a multiplexer 55A.

A user interface controlling portion 56 is a module that processes an input operation of the user. The user interface controlling portion 56 has operation buttons/switches (not shown) that allow the user to manually operate the receiving system. In addition, the user interface controlling portion 56 has a function for accepting a remote control operation from a remote controller 66 through infrared ray (IR). The user interface controlling portion 56 may contain a display panel and LED indicators (not shown) for displaying the currently designated contents.

One of the operation buttons of the user interface controlling portion 56 or one of the operation buttons of the remote controller 66 is assigned to a button for validating/invalidating a display output of an OSD display controller 57 (namely, display output of program information or the like corresponding to digital transmission data).

The CPU (Central Processing Unit) 11 is a main controller that totally controls the overall operation of the receiving system 10-A. In addition, the CPU 11 can process digital transmission data transferred through the bus 50. Delivery contents contained in digital transmission data are described in the XML (extensible Markup Language) format (that will be described later). The CPU 11 can execute software for processes such as XML parsing process, an XSL process, and a browsing process (display output or print output) on a platform provided by the operating system (OS).

A RAM (Random Access Memory) 12 is a writable non-volatile memory that loads an executable program code of the CPU 11 and stores work data of an executable program. A ROM (Read Only Memory) 13 is a read only memory that permanently stores a self diagnosis-initialization program and a hardware operating micro-code. The self diagnosis-initialization program is executed when the power of the receiving system 10-A is turned on.

A serial input/output (SIO) controller 14 is a peripheral controller that serially exchanges data with an outer unit of the receiving system 10-A. The SIO controller 14 has a serial port that is connected to a high speed modem 63 that modulates and demodulates transmission data over an analog telephone line (the transmission rate of the high speed modem 63 is for example 56 kbps). With the high speed modem 63 connected to a predetermined access point (not shown) corresponding to the PPP (Point-to-Point Protocol) connecting method, the receiving system 10-A is connected to the Internet 7 as a wide area network.

An IEEE 1394 interface 15 is a serial high speed interface that allows data to be transmitted and received at around several 10 Mbps of transmission rate. External units corresponding to the IEEE 1394 standard can be connected to the IEEE 1394 port in the daisy chain connecting method or the tree connecting method. Examples of the external units corresponding to the IEEE 1394 standard are a video camera 64 and a scanner (not shown).

A hard disk drive (HDD) 17 is an external storing unit that stores a program and data in a predetermined file format. The storage capacity of the HDD 17 is as large as several gigabytes. The HDD 17 is connected to the bus 50 through a hard disk interface 18.

The card interface 18 is a unit that accomplishes a bus protocol between a card type device 65 and the bus 50. The card type device 65 is attached to a card slot 19. An example of the card type device 65 is a cartridge type PC card in the size of a credit card. The PC card is based on "PC Card Standard" that is a joint standard of PCMCIA (Personal Computer Memory Card Interface Association) and JEIDA (Japan Electronic Industry Development Association).

An example of the PC card is a memory card composed of a non-volatile, erasable, and rewritable memory chip such as EEPROM (Electrically Erasable and Programmable ROM). When the receiving system 10-A is structured in a small size at low cost, it may be difficult to dispose the HDD 17 that has a large storage capacity. In such a case, it may be preferred to use a memory card that is attachable and detachable to/from the receiving system 10-A and that has an excellent portability. However, it should be noted that the attachable/detachable memory 65 is not limited to the form factor of a PC card. Instead, the attachable/detachable memory 65 may be a "memory stick" (trademark) that has been proposed by the applicant of the present invention.

The OSD display controller 57 is a dedicated controller that displays data in the OSD (Open Software Description) format. The OSD is an information descriptive format for distributing and installing software. The OSD is suitable for a push delivery and an automatic installation in combination with the CDF (Channel Definition Format). The OSD was proposed by Marimb Company (US company) and Microsoft Company (US company) and supported by Netscape Company, Cyber Media Company, Install Shield Software Company, and so forth.

In the digital satellite data receiving system 10-A, the CPU 11 controls the tuning operation of the tuner 51 corresponding to a user input command through the user interface controlling portion 56 and controls the display of a data broadcast. In other words, the CPU 11 processes digital transmission data received from the TS decoder 53, converts the resultant data to display data, and supplies the converted data to the OSD display controller 57. The OSD display controller 57 generates a picture signal of program information corresponding to the display data and supplies the generated signal to the multiplexer 55B. In addition, the CPU 11 processes audio data contained in the digital transmission data and supplies the processed audio data to the multiplexer 55A through the bus 50. The multiplexers 55A and 55B multiplex the display data and audio data supplied from the CPU 11 with the video data and audio data as the broadcast program main body that are output from the AV decoder 54 and output the multiplexed data to the display 61 and speaker 62, respectively. The process for the digital transmission data will be described later.

Figure 4:
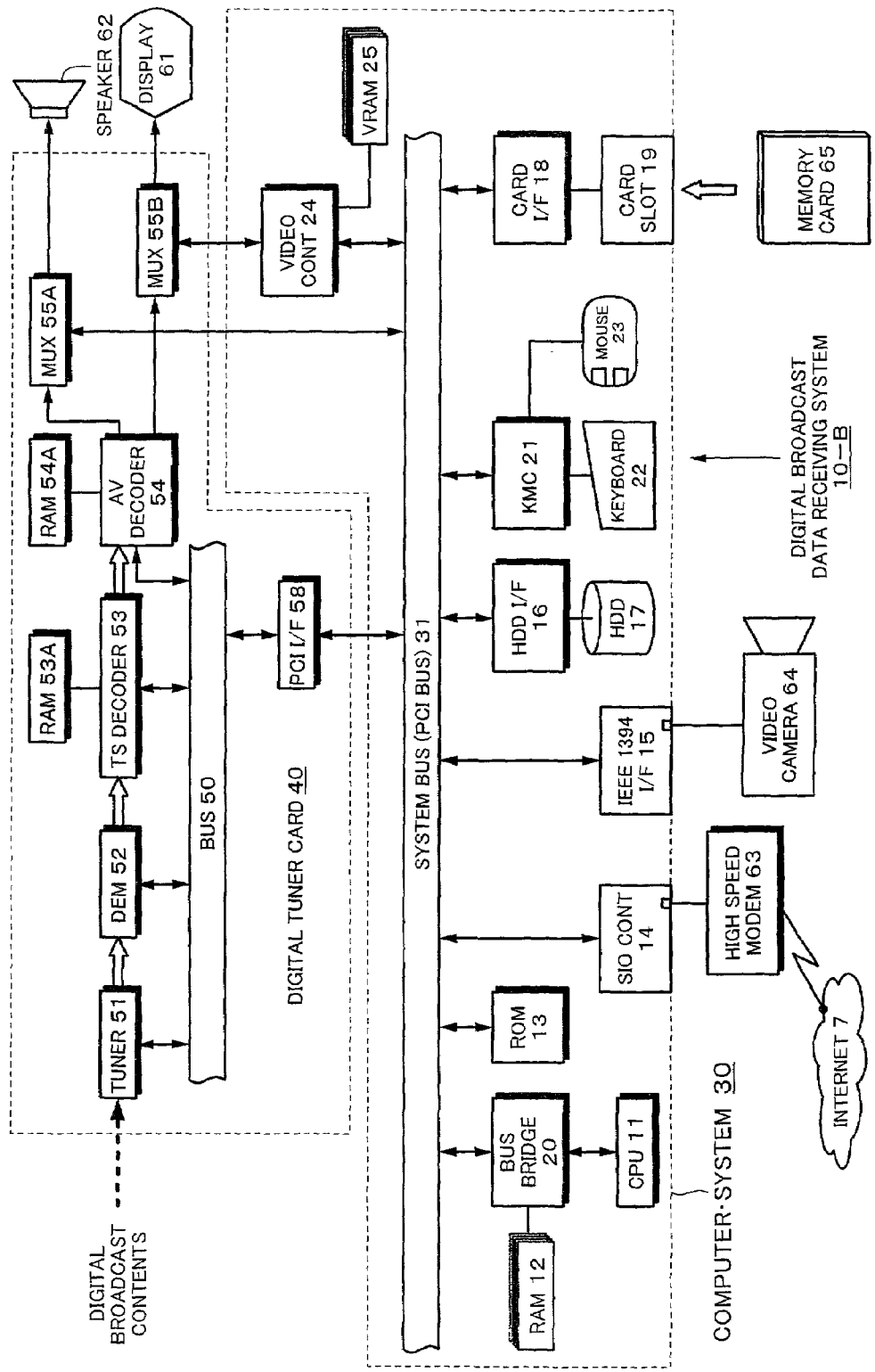
FIG. 4 is a block diagram showing the hardware structure of another example of a receiving system 10-B, in reality, a block diagram showing the hardware structure of the receiving system 10-B of which a digital satellite data broadcast tuner card is attached to a general purpose computer system.

FIG. 4 shows the hardware structure of an another example of the digital broadcast data receiving system. The receiving system 10-B is accomplished in the structure of which a digital satellite data broadcast tuner card 40 is attached to a general purpose computer 30.

The digital tuner card 40 is composed of a tuner 51, a demodulator 52, a TS decoder 53, an AV decoder 54, RAMs 53A and 54A, and multiplexers 55A and 55B. For simplicity, in FIG. 4, similar portions to those in FIG. 3 in structure and function are denoted by similar reference numerals. The digital satellite data broadcast tuner card 40 is connected to a system bus (PCI bus) 31 of the computer system 30 through a bus interface (PCI interface) 58 (see FIG. 4).

A broadcast wave is received from an antenna (not shown). The tuner 51 tunes the broadcast wave and outputs the tuned data to the demodulator 52. The demodulator 52 demodulates the tuned data. The TS decoder 53 interprets a transport stream and separates it into AV data (compressed corresponding to the MPEG2 standard) and digital transmission data. The AV data is supplied to the AV decoder 54. The AV decoder 54 processes the AV data in the above-described manner and outputs the resultant data to the outside. The digital transmission data is sent to the general purpose computer 30 through the PCI interface 58. The CPU 11 of the system processes the digital transmission data (the detail will be described later).

On the other hand, the general purpose computer system 30 contains a printed wiring board (not shown) that mounts main circuit components including a CPU 11 (that will be described later). The board is also referred to as "mother board". The above-described tuner card 40 is provided as for example an "adaptor card" and attached to a bus slot (not shown) of the mother board.

However, the tuner card 40 is provided as a PC card based on the PCMCIA (Personal Computer Memory Card Interface Association) standard and JEIDA (Japan Electronic Industry Development Association) standard, not as an adaptor card. When the tuner card 40 is attached to a PC card slot 19 (that will be described later), the tuner card 40 can be also attached to the system structure of the computer system 30.

The CPU 11 is a main controller that totally controls the overall operation of the computer system 30. In this example, the CPU 11 can execute various software programs for processing XML contents such as an XML parsing process, an XSL process, and a browsing process (that will be described later) on a platform provided by the operating system (OS).

A processor bus directly connected to external pins of the CPU 11 is mutually connected to a system bus 31 through a bus bridge 20.

The bus bridge 20 according to the embodiment of the present invention contains a data buffer and a memory controller. The data buffer absorbs the speed difference between the processor bus and the system bus 31. The memory controller controls the memory access operation for a RAM 12.

The RAM (Random Access Memory) 12 is a writable non-volatile memory that loads an executable program code of the CPU 11 and stores work data of an executable program. Normally, the RAM 12 is composed of a plurality of DRAM (Dynamic RAM) chips.

The system bus 31 is a common signal transmission path containing for example an address bus and a control bus. The system bus 31 is for example a PCI (Peripheral Component Interconnect) bus. On the system bus 31, various peripheral units corresponding to the PCI interface standard are mutually connected. An example of the peripheral units is the above-described digital satellite data broadcast tuner card 40. Each peripheral unit on the system bus 31 is assigned a unique I/O address (or a memory address). When the CPU 11 (more specifically, a program executed by the CPU 11) designates an I/O address (or a memory address), data and a command can be transmitted to a desired peripheral unit.

A ROM (Read Only Memory) 13 is a read only memory that permanently stores a self diagnosis program (POST) (that is executed when the computer system 30 is turned on) and a basic input/output system (BIOS) (that is used to operate the hardware). The ROM 13 may be composed of an EEPROM (Electrically Erasable and Programmable ROM) of which data can be electrically erased and rewritten.

A serial input/output (SIO) controller 14 is a peripheral controller that serially exchanges data with external units of the computer system 30. A serial port provided by the SIO controller 14 is connected to an external high speed modem 63 (at for example 56 kbps of transmission rate). The high speed modem 63 modulates and demodulates transmission data on an analog telephone line. When the high speed modem 63 is connected to a predetermined access point (not shown) corresponding to the PPP (Point-to-Point Protocol) connecting method, the computer system 30 (namely, the receiving system 10-B) is connected to the Internet 7.

An IEEE 1394 interface 15 is a serial high speed interface that allows data to be transmitted and received at around several 10 Mbps. External units corresponding to the IEEE 1394 standard can be connected to the IEEE 1394 port in the daisy chain connecting method or the tree connecting method. Examples of the external units corresponding to the IEEE 1394 standard are a video camera 64 and a scanner (not shown).

A hard disk drive (HDD) 17 is an external storing unit that stores a program and data in a predetermined file format. The storage capacity of the HDD 17 is as large as several gigabytes. The HDD 17 is connected to a system bus 33 through a hard disk interface 16. The interface standard for connecting the hard disk drive to the computer system 30 is for example the IDE (Integrated Drive Electronics) standard or the SCSI (Small System Interface) standard.

A keyboard/mouse controller (KMC) 21 is a dedicated controller that processes user input data received from a keyboard 22, a mouse 23, and so forth. When the KMC 21 detects a scan code that is input from the keyboard 22 or coordinate designation data that is input from the mouse 23, the KMC 21 issues an interrupt request to the CPU 11. According to the embodiment of the present invention, along with commands that are input to the computer system 30, an input operation for the receiving system 10-B (for example, a channel selection operation) can be performed with the keyboard 22 and the mouse 23.

One of function keys of the keyboard 22 or one of menu buttons on the display 61 is assigned a button for validating/invalidating a display output of a video controller 24 (namely, a display output of program information and so forth corresponding to digital transmission data).

A card interface 18 is a unit that accomplishes a bus protocol between a bus 50 and a card type device 65. The card type device 65 is attached to a card slot 19. An example of the card type device 65 is a cartridge type PC card in the size of a credit card. The PC card is based on the "PC Card Standard" that is a joint standard of the PCMCIA (Personal Computer Memory Card Interface Association) standard and the JEIDA (Japan Electronic Industry Development Association) standard.

An example of the PC card is a memory card composed of a non-volatile, erasable, and rewritable memory chip such as EEPROM (Electrically Erasable and Programmable ROM). When the receiving system 10-A is structured in a small size at low cost, it may be difficult to dispose the HDD 17 that has a large storage capacity. In such a case, it may be preferred to use a memory card that is attachable and detachable to/from the receiving system 10-A and that has an excellent portability. However, it should be noted that the attachable/detachable memory 65 is not limited to the form factor of a PC card. Instead, the attachable/detachable memory 65 may be a "memory stick" (trademark) that has been proposed by the applicant of the present invention.

A video controller 24 is a dedicated controller that controls a screen display corresponding to a drawing instruction received from the CPU 11. The video controller 24 has a frame memory (VRAM) 25 that temporarily stores drawing information. To preferably accomplish the present invention, it is preferred that the video controller 24 has a drawing performance greater than the VGA (Video Graphic Array) standard (for example, the SVGA (Super Video Graphics Array) standard or the XGA (extended Graphics Array) standard).

In the digital satellite data broadcast receiving system 10-B, the CPU 11 controls the tuning operation of the tuner 11 corresponding to a user input command through the keyboard 22 and the mouse 23. In addition, the CPU 11 controls the display of the data broadcast. In other words, the CPU 11 processes digital transmission data received from the TS decoder 53, converts the resultant data to display data, and supplies the converted data to the video controller 24. The video controller 24 generates a picture signal of program information corresponding to the display data and supplies the generated signal to a multiplexer 55B. In addition, the CPU 11 processes audio data contained in the digital transmission data and supplies the processed audio data to a multiplexer 55A through the bus 50. The multiplexers 55A and 55B multiplex the display data and audio data supplied from the CPU 11 with the video data and audio data as the broadcast program main body that are output from the AV decoder 54 and output the multiplexed data to the display 61 and speaker 62, respectively. The process for the digital transmission data will be described later.

To compose the digital satellite data receiving system 10, many electric circuits and so forth are required along with the circuits shown in FIGS. 3 and 4. However, such circuits are well known by those of the art. In addition, they do not compose the principal portion of the present invention. Thus, the description of those circuits is omitted in the specification. In addition, for simplicity, connections of the hardware blocks are partly omitted.

For example, a record medium such as a FD (Floppy Disc), a CD-ROM, an MO (Magneto-Optical disc), or a memory stick is attached to the receiving system 10. An external storing unit (such as an FDD (Floppy Disc Drive), a CD-ROM drive, or an MO drive) or a memory stick may be disposed in the receiving system 10.

Figure 5:
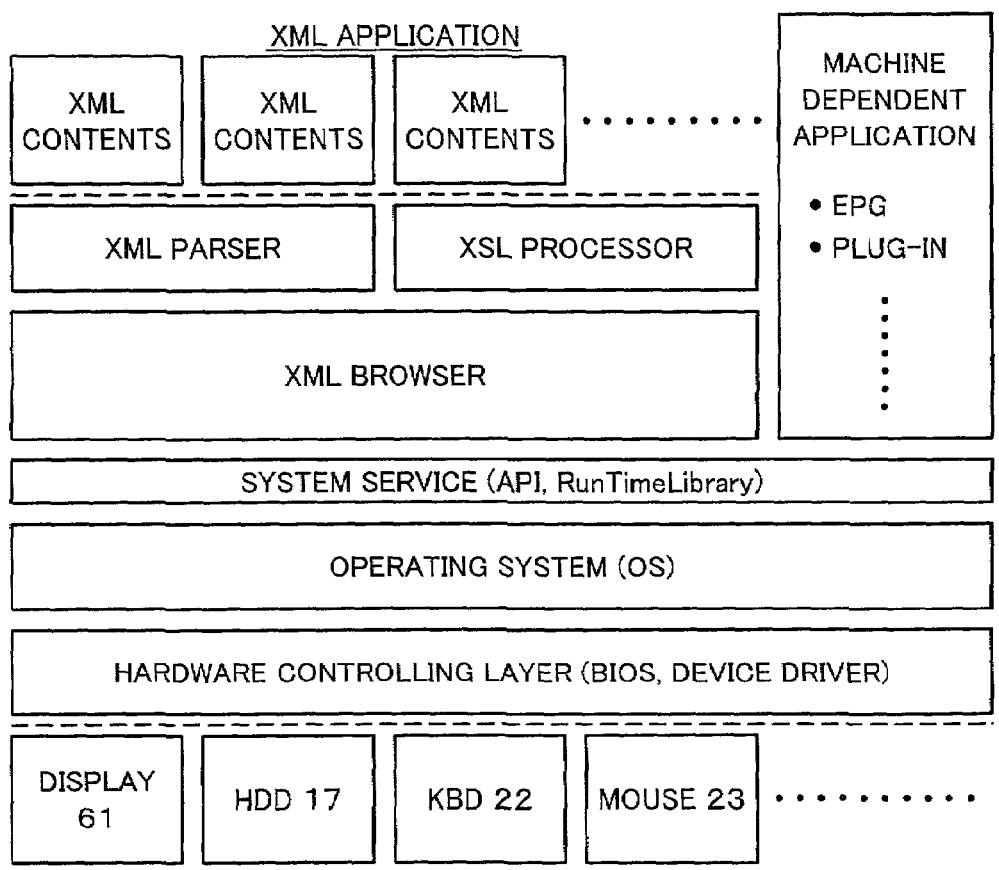
FIG. 5 shows a hierarchical structure of various types of software programs executed by the digital broadcast data receiving system 10.

FIG. 5 shows a hierarchical structure of various software programs executed by the digital broadcast data receiving system 10. Next, the function of each layer of software program will be described.

A hardware control layer as the lowest layer allows the operating system (OS) or the like to absorb the difference of hardware against an upper software program and perform direct input/output operations against each hardware component and a process corresponding to each hardware interrupt.

The hardware control layer is provided as for example a BIOS (Basic Input/Output System) permanently stored in the ROM 13 or a "device driver" installed to the HDD 17 to the digital satellite data broadcast receiving system 10.

The operating system (OS) is basic software that totally manages hardware and software of the digital satellite data broadcast receiving system 10. The OS contains sub systems that are a "file manager" (that manages the recording operation of files of the HDD 17), a "memory manager" (that manages the memory space), a "resource manager" (that manages the assignments of the system resource), a "scheduler" (that manages the execution of tasks), and a "window system" (that controls windows on the display).

A system service is a set of functions that cause an upper program such as an application program to call each function against the OS. An example of the system service is a run time library (or a dynamic link library). With the system service, the application program does not need to directly operate each hardware component. As a result, the hardware operations can be securely unified.

An XML application is a program for controlling display, output, and so forth of a data broadcast. The XML application is an XML document described in the XML that is a language with tags that can be freely defined. Each XML document is accompanied by style sheets that are a DTD document (that defines a document type), an XSL document (that defines a display format) (or a CSS document or an XSLT document where XSLT is a derivative of XSL).

An XML parser is a software program for parsing a DTD document and an XML instance. A document object as a parsed result is sent to an XSL processor. The document object is a structured document of which a tree is structured with tags described in the original XML document.

An XSL processor is a software program for converting a document object into a representation format corresponding to the description of an XSL document. A document that has been converted by the XSL processor can be browsed by an XML browser. With the XSLT (XSL Transformation), which is a derivative standard of the XSL, a document converted by the XSL processor can be browsed by another browser (for example, an HTML browser or another custom browser).

Next, a broadcast data receiving process of the digital satellite data receiving system 10 according to the embodiment of the present invention will be described with reference to FIGS. 6 to 8.

Figure 6:
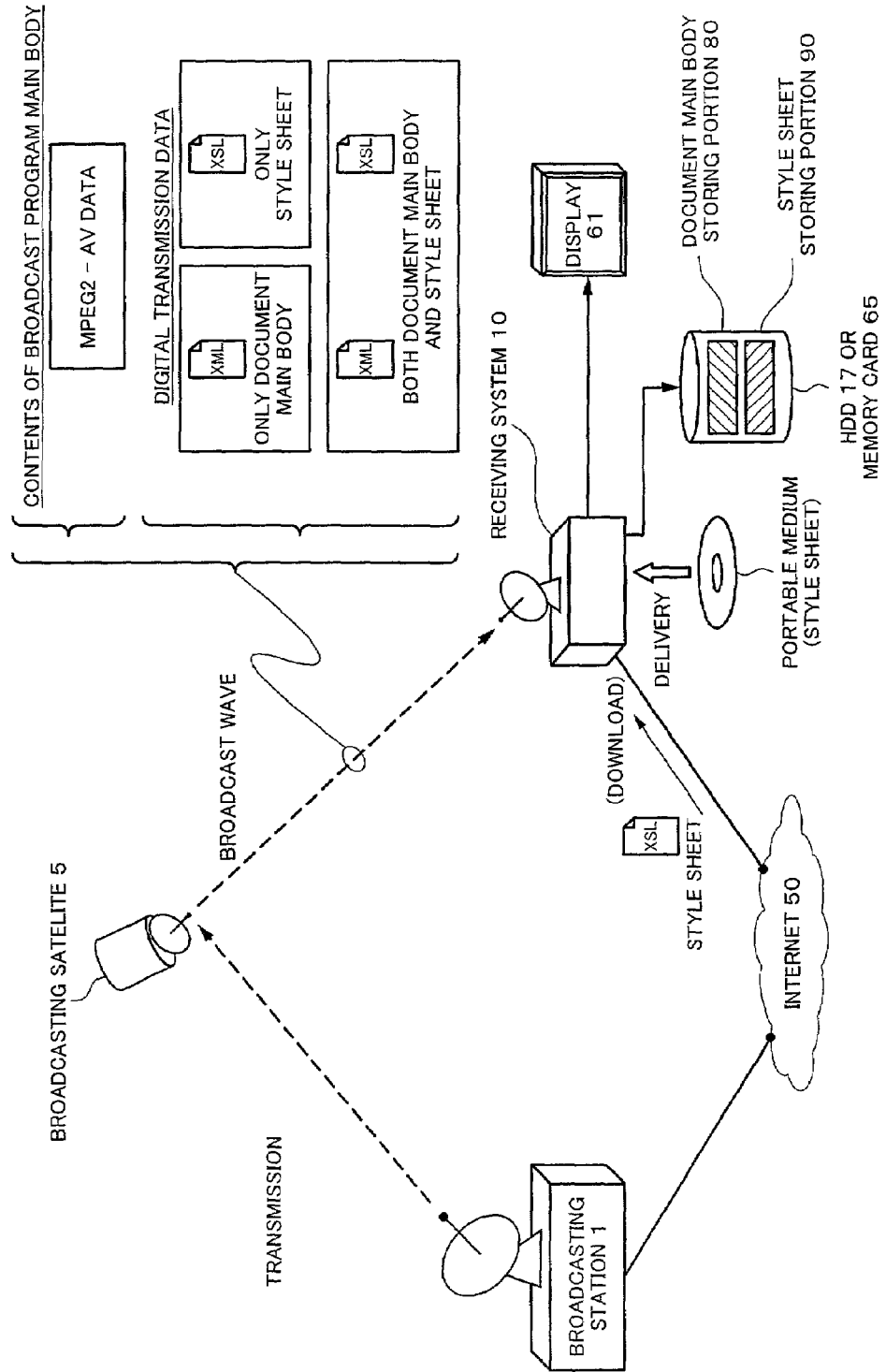
FIG. 6 is a schematic diagram showing an operation of which broadcast contents are transmitted from the broadcasting station 1 to the receiving station 10 through a broadcasting satellite 5.

As shown in FIG. 6, in the digital satellite data broadcasting system 1000, a broadcast wave is transmitted from the broadcasting station 1 to the broadcasting satellite 5. Thereafter, the broadcast wave is transferred from the broadcasting satellite 5 to the receiving station 10. The contents of the transmission broadcast wave are composed of video data and audio data (AV data) (that compose a satellite broadcast program main body) and digital transmission data that is accompanied by the broadcast program main body.

Figure 7:
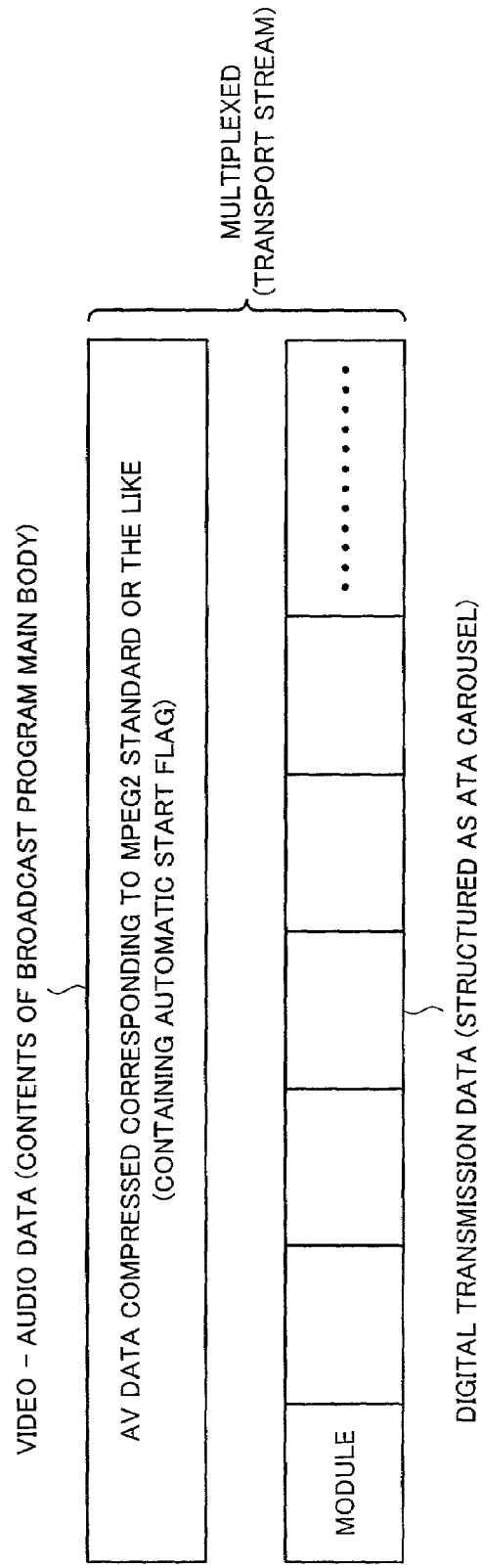
FIG. 7 is a schematic diagram showing the structure of broadcast contents propagated as a broadcast wave.

FIG. 7 is a schematic diagram showing the structure of broadcast contents propagated as a broadcast wave. As shown in FIG. 7, the broadcast contents are composed of a "transport stream" of which AV data that has been compressed corresponding to the MPEG2 (Motion Picture Experts Group phase 2) standard and digital transmission data (the "transport stream" is a data format defined in the transport layer of the OSI (Open System Interconnection) reference model. The AV data composes a satellite broadcast program main body, whereas the digital transmission data composes a data broadcast such as broadcast program information accompanied by the broadcast program main body.

As was described above, the TS decoder 53 parses the transport stream and separates it into an AV data portion and a digital transmission data portion. The AV data is processed by the AV decoder 54, whereas the digital transmission data portion is processed by the CPU 11.

The digital transmission data portion is composed of a plurality of modules each of which contains an EPG, advertisement information, and various types of information accompanied by a broadcast program main body. The digital transmission data portion is structured as a data carousel so that each module repeatedly takes place in the broadcast program main body (as a result, since the receiving system 10 as an audience can obtain a module at any timing in the broadcast program period, a cache memory can be omitted). In addition, an automatic start flag may be placed in the AV data that has been compressed corresponding to the MPEG2 standard so as to synchronize with the display output of each module.

Figure 8:
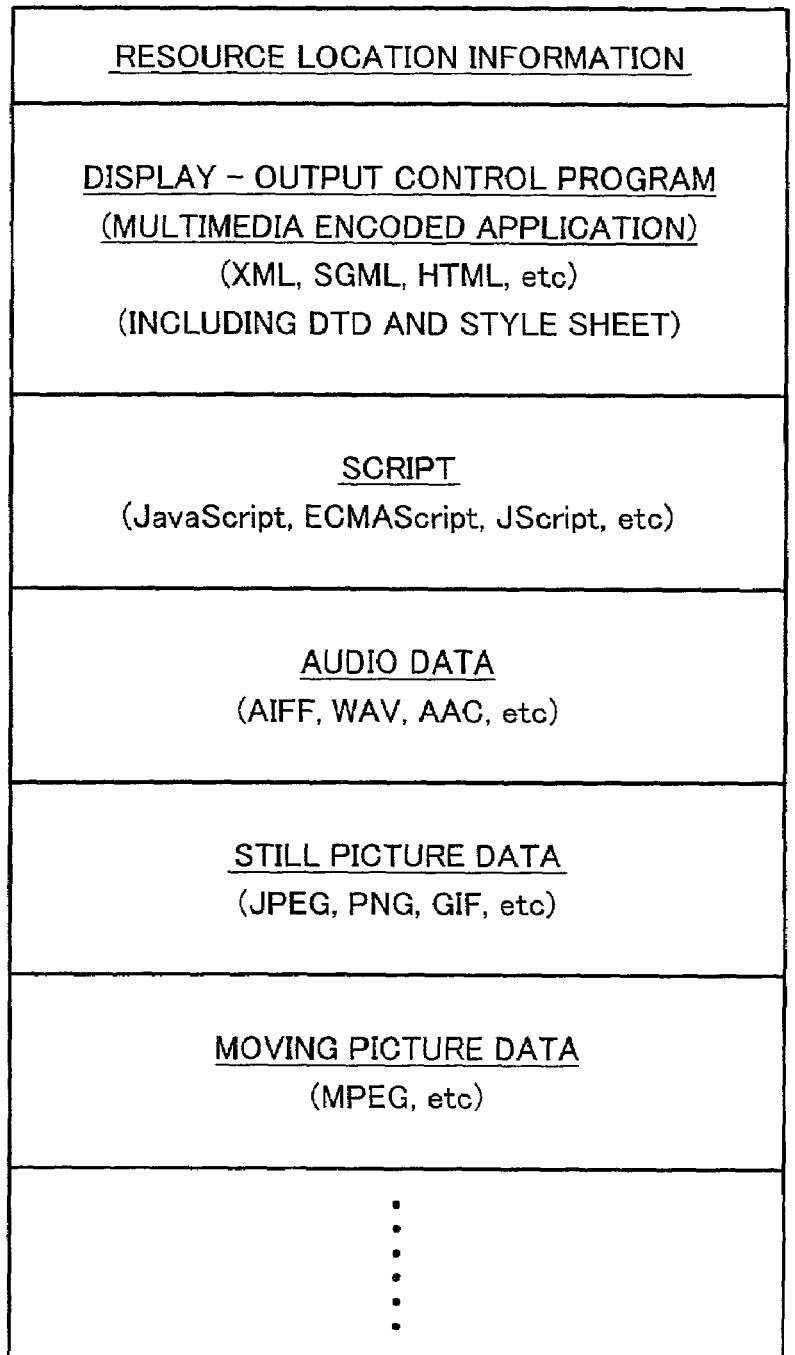
FIG. 8 is a schematic diagram showing the data structure of a module that composes digital transmission data.

FIG. 8 shows the data structure of each module. As shown in FIG. 8, one module is composed of a plurality of resource elements that are a control program (multimedia encoded application) (that defines a display and an output of a data broadcast), a script (that defines an operation), and mono-media data (such as a sound, text data, a still picture, and a moving picture). Each mono-media data is an object that composes a part of a data broadcast. Each mono-media data is integrally handled by the multimedia encoded application. Each resource element is an independent file that has a predetermined format. Audio data is described in a music file format such as AIFF, WAV, or AAC. A still picture is described in a picture file format such as JPEG, PNG, or GIF. Resource location information at the top of each module describes the position information of each resource element of the module.

The "multimedia encoded application" is a program for controlling the display and output of each of various types of broadcast data accompanied by a broadcast program main body. The broadcast data contains an EPG, advertisement information, and so forth. The multimedia encoded application is an XML application described in the XML (extensible Markup Language) format. However, it should be noted that the multimedia encoded application may be described in other than the XML language, but another markup language such as SGML or HTML. An XML document may contain a DTD document that defines a document format. In addition, since an XML document does not contain style information that designates the real representation format, a style sheet may be delivered.

A style sheet is a data file that designates a real representation format of an XML document as output contents (a style sheet may contain multimedia contents such as a sound and a still picture). A style sheet is a document file described in the XSL (extensible Stylesheet Language) format. The style sheet converts an XML document into a display output format of the display 61 (or a print output format of a printer (not shown)). Alternatively, besides a style sheet, a script for defining operations of multimedia contents composed of various types of mono-media data such as a sound, a text, a still picture, and a moving picture may be delivered (in this case, a style sheet is described in a script language such as JavaScript, ECMAScript, or Jscript).

On the receiving system 10 side, necessary data of the received delivery contents is temporarily stored to a local storing unit of the system 10. The local storing unit is for example the HDD 17 (or the card type device 65).

In the one-way transmission environment such as a satellite broadcast, contents described in a conventional XML language are transmitted in the state that an XML document and a style sheet are packed unless a style sheet is designated.

According to the embodiment, in the digital transmission data portion of the broadcast contents, output contents (XML document) and a style sheet (XSL document) are packed. Alternatively, only an XML document or only an XSL document may be transmitted. Alternatively, an XSL document may be downloaded through a network such as the Internet. Alternatively, an XSL document may be supplied using a portable storage medium such as an FD, a CD-ROM, an MO, or a memory stick.

In addition, a delivery/distribution source of a style sheet may deliver or distributes a scrambled style sheet. In this case, only an authorized user who has unscrambling key data can primary and secondary use the style sheet. In this case, as a contents delivery business, unscrambling key data that is delivered may be charged rather than a style sheet that is delivered.

As shown in FIG. 6, in the receiving system 10 according to the embodiment of the present invention, an XML document and a style sheet may be separately stored. The HDD 17 (or the memory card 65) that stores supplied document files has a document main body storing portion 80 and a style sheet storing portion 90. The document main body storing portion 80 stores and manages only an XML document (the document main body storing portion 80 may contain a DTD document). The style sheet storing portion 90 stores and manages only a style sheet.

Since an XML document and a style sheet are separately managed, information can be more flexibly and effectively delivered.

For example, an electronic program guide (EPG) used in a digital satellite data broadcast describes dedicated program information about each program. Conventionally, an electronic program guide is delivered using a dedicated transmission channel or a V blank of a television broadcast. In such a case, the representation format of program information is designated when a broadcast service is started. The representation method depends on each receiver. Thus, in the conventional delivery method, the flexibility and efficiency are insufficient.

On the other hand, according to the embodiment of the present invention, an XML document as broadcast program information and a style sheet for defining a representation format thereof can be combined in any manner. For example, the representation format of a single broadcast program information can be selected from a plurality of style sheets. In other words, unlike with the conventional method, the representation format of broadcast program information can be flexibly and effectively changed. Thus, when a style sheet is properly selected, the difference of the representation between a television receiver and a portable terminal unit can be flexibly handled. Alternatively, one style sheet may be shared by a plurality of XML documents. Likewise, a plurality of style sheets may be shared by a plurality of XML documents.

Since a style sheet stored in the receiving system 10 is text data, the user can read it. Thus, the user (audience) can correct it through consoles such as the keyboard 22 and the display 61. In addition, the style sheet can be frequently changed corresponding to broadcast program information. In other words, a style sheet can be fully customized. However, when a broadcast provider as a delivery-distribution source of a style sheet scrambles the style sheet, it can restrict or prohibit the secondary use of the style sheet.

Figure 9:
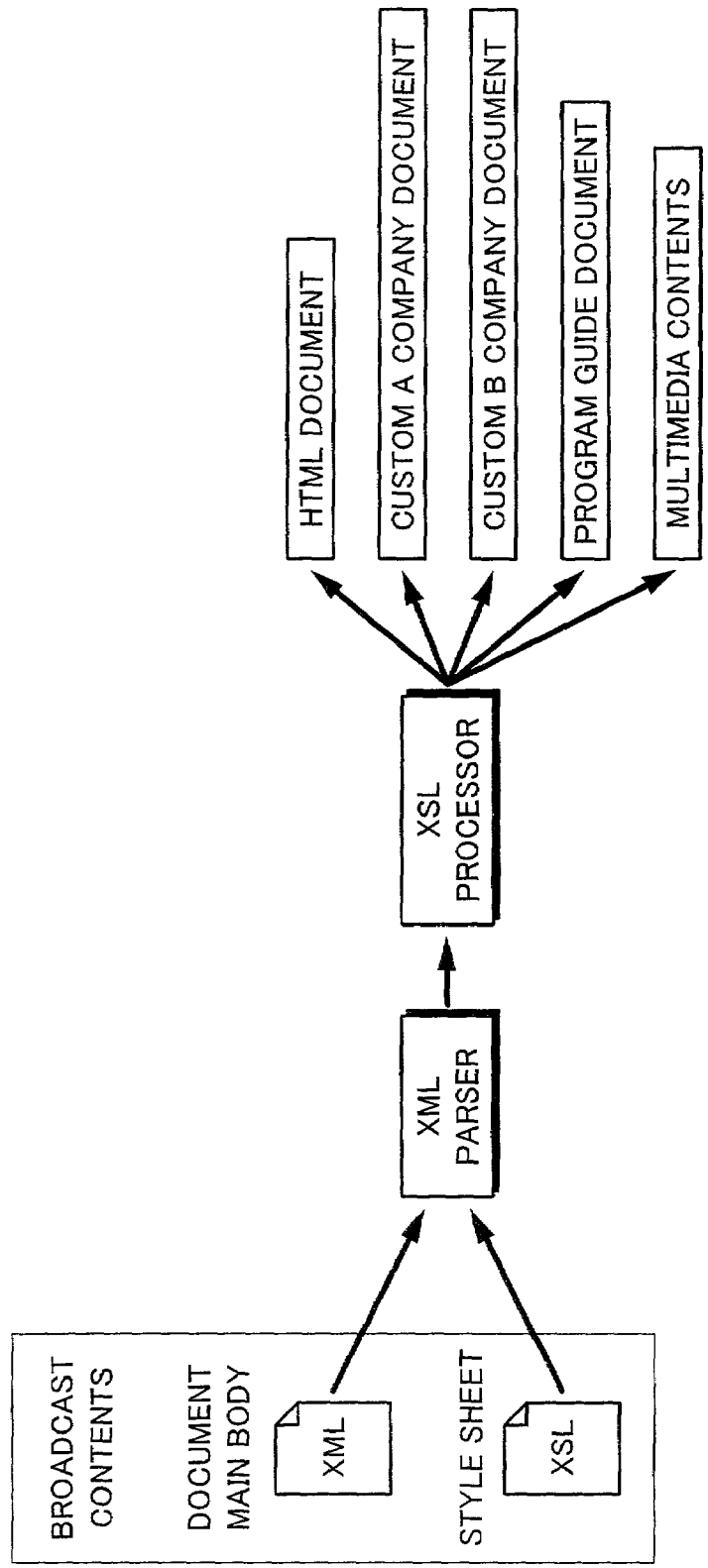
FIG. 9 is a schematic diagram showing a digital transmission data portion processed by the digital satellite data broadcast receiving system 10.

Next, a process for digital transmission data portion by the digital satellite data broadcast receiving system 10 will be described with reference to FIG. 9.

As was described above, the receiving system 10 can obtain a style sheet that is packed to a document main body (namely, an XML document) or that is separated from the document main body. A document main body is not always limited to an XML document, but a document described in another markup language format such as SGML (Standard Generalized Markup Language) or HTML. When an XML document is applied to for example a television broadcast or the like and presented along with other multimedia contents, the multimedia contents are also contained in the document main body. In addition, a style sheet is a document that is described in the XSL format and that defines the representation format of an XML document main body.

A document main body may contain a DTD document along with an XML document. A document main body is parsed by a parsing program referred to as XML parser. The parsed document object is sent to the XSL processor along with a style sheet (namely, an XSL document).

The XSL processor converts a document object into a drawable data format corresponding to the description of an XSL document and creates a document corresponding to the style. When a style sheet for the same document main body is changed, various drawable format documents such as an HTML (Hyper Text Markup Language) document, a custom A company document, a custom B company document, a program guide document, and multimedia contents can be created.

An HTML document is a document that can be drawn using so-called HTML browser such as Netscape Company (US company) "Netscape Navigator" or Microsoft Company (US company) "Internet Explorer". The custom A company document and the custom B company document are documents that can be drawn by custom browsers provided by A company and B company, respectively.

Next, screen information provided to the digital satellite data broadcast receiving system 10 according to the embodiment of the present invention will be described.

As was described above, contents of a digital satellite data broadcast is composed of AV data as a broadcast program main body and digital transmission data as broadcast program information accompanied by the broadcast program main body. An example of the broadcast program information is an EPG (Electric Program Guide) (that contains delivery information such as a broadcast schedule of broadcast programs and program names and a VTR record reserve function).

The AV data is decoded and reproduced by the AV decoder 54. On the other hand, the broadcast program information is processed by the CPU 11 and assembled as screen display information. A display output signal of the screen display information is generated by the OSD display controller 57 or the video controller 24. One of the operation buttons of the user interface controlling portion 56 or one of the function keys of the keyboard 22 is assigned an operation for validating/invalidating the display output of the broadcast program information (as was described above).

Figure 10A:
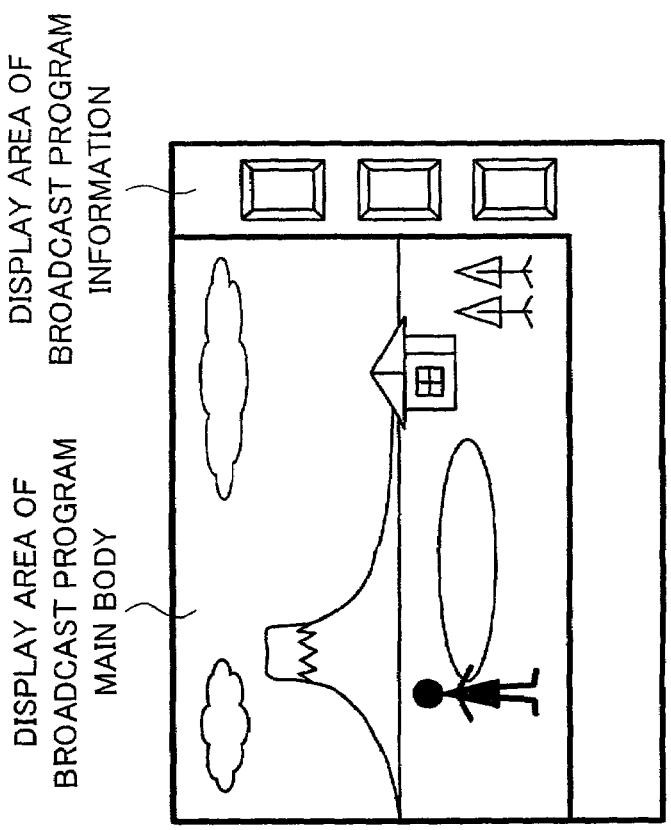
FIG. 10A is a schematic diagram showing a screen for displaying only a broadcast program in the sate that broadcast program information has been invalidated.

When the broadcast program information has been invalidated, AV data as a broadcast program main body is displayed on the full screen of the display 61 (see FIG. 10A). In contrast, when the broadcast program information has been validated, a particular area on the screen of the display 61 is used for displaying the broadcast program information (see FIG. 101B).

The representation format provided by broadcast program information includes menu buttons such as "record" and "record reserve" provided by for example an EPG. With the representation of the broadcast program information, an advanced function and a value-added-service accompanied by a broadcast program can be provided to users (audiences). On the other hand, since the display area of the broadcast program main body becomes narrow, some audiences may do not like this representation.

Figure 11:
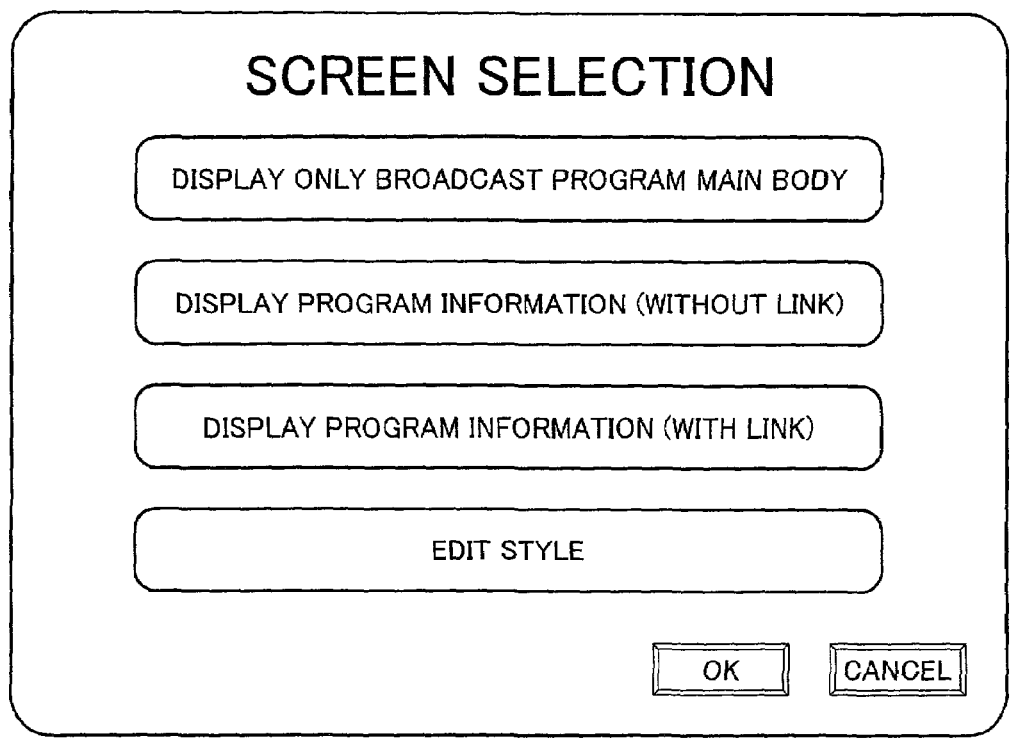
FIG. 11 is a schematic diagram showing a selection screen provided to a user (audience).
Figure 14:
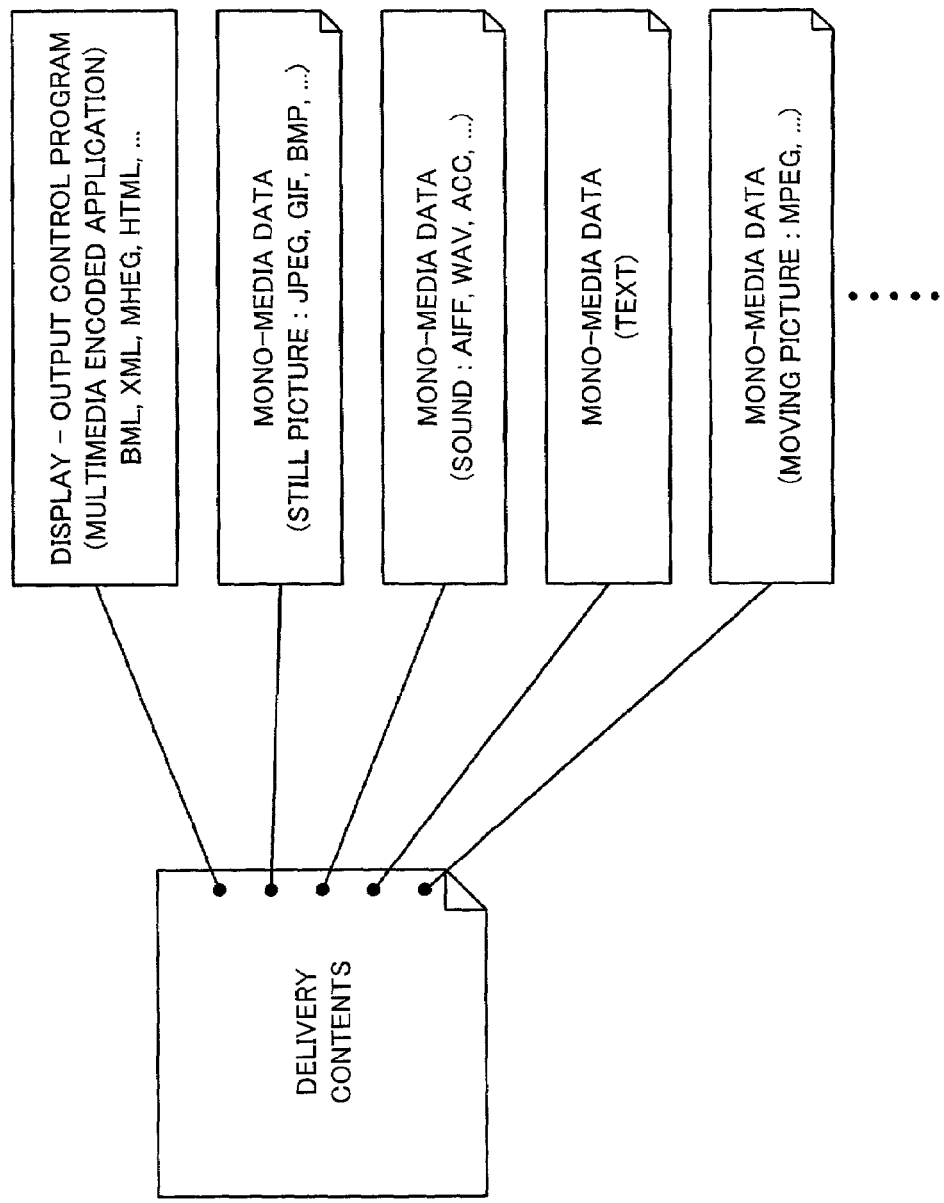
FIG. 14 is a schematic diagram showing the structure of contents delivered as digital transmission data.

Thus, in the digital satellite data broadcast receiving system 10 according to the embodiment of the present invention, when a broadcast program is displayed, a selection screen as shown in FIG. 11 is provided to users. The selection screen contains selection menu items "Display only broadcast program main body", "Display program information (without link)", "Display program information (with link)", "Edit style", and so forth.

When the menu item "Display only broadcast program main body" is selected, the output of the broadcast program information (EGP) processed and created by the CPU 11 is invalidated. At that point, only video data and audio data that are output from the AV decoder 54 are output to the outside. As a result, as shown in FIG. 10A, the entire screen of the display 61 is assigned to the broadcast program main body.

Figure 10B:
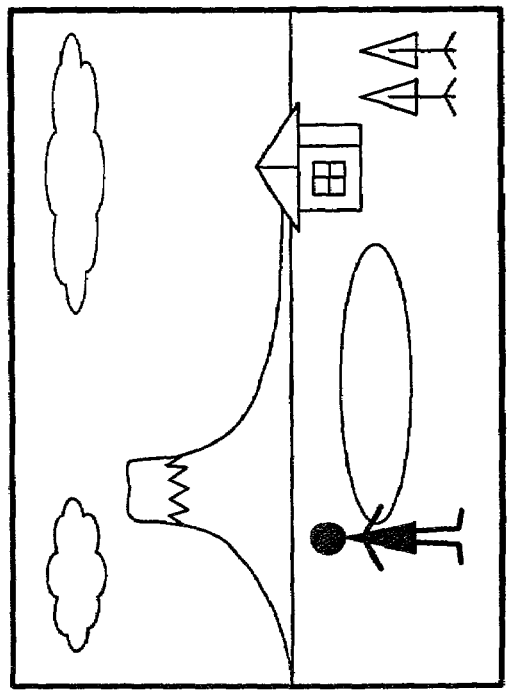
FIG. 10B is a schematic diagram showing a screen for displaying broadcast program information.

On the other hand, when the menu item "Display program information (without link)" or "Display information (with link)" is selected, the output of the broadcast program information (EPG) processed and created by the CPU 11 is validated. In other words, video data and audio data that are output from the AV decoder 54 and the video data and audio data processed and created by the CPU 11 are multiplexed by the multiplexers 55A and 55B, respectively. The multiplexed data are output to the outside. As a result, as shown in FIG. 10B, a part of the screen area of the display 61 is assigned to the broadcast program information.

In this example, a link is access information against another resource object. An original XML document contains an address of a link destination (for example, an object identifier such as a URL (Uniform Resource Locator). An option "without link" is a representation format of which the menu buttons do not contain link information. On the other hand, an option "with link" is a representation format of which the menu buttons contain link information. In this case, when a menu button is operated, an operation for obtaining a relevant resource object is started.

A resource object may be data such as a sound, a still picture, or a moving picture as well as screen display information described as an XML document. A linked resource object can be obtained from a local storing unit (namely, the HDD 17 or the memory card 65) of the receiving system 10. Alternatively, a resource object may be provided by an object server (for example, a HTTP (Hyper Text Transfer Protocol) server) that is disposed on the Internet 7.

FIG. 12 shows a screen operation in the case that a menu button [access] containing link information is operated.

[access] is an optional function that requires an access method (namely, traffic means) for the location of information presented by a broadcast program main body. With the option [access], as shown in FIG. 12, map information is popped up.

In addition, as shown in FIG. 12, the broadcast program information may contain text information of such as a whether report (in the example, "Tomorrow's chance of rain in Kanto area is 20%").

On the other hand, when the menu item "Edit style" is selected, an edit screen for a style sheet is displayed on the display 61 (alternatively, a style sheet edit window is popped up). The screen displays a source code list of the style sheet. FIG. 13 shows an example of a style sheet edit screen that is displayed on the display 61.

The style sheet is composed of text format data corresponding to the syntax of a language such as XSL, CSS, or XSLT. On the style sheet edit screen, the user can perform a regular edit operation using the keyboard 22 and the mouse 23.

The present invention was described with reference to a particular embodiment. Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

As was described above, according to the present invention, in a digital data delivery such as a digital satellite data broadcast and a multimedia contents communication, information can be provided corresponding to needs and favorites of users (audiences).

In addition, according to the present invention, when digital data composed of instructions of a computer language having data attributes (such a computer language is a markup descriptive language for example XML) is delivered, information can be provided corresponding to the need and favorites of users (audiences).

In addition, according to the present invention, data in a markup language format delivered by a digital satellite data broadcast or the like can be provided in a representation format corresponding to the needs and favorites of users (audiences).

In addition, according to the present invention, a technology for using a style sheet corresponding to the needs and favorites of users (audiences) against data in a markup language format delivered by a digital satellite data broadcast can be provided.

The invention claimed is:

1. A contents receiving system for receiving delivery contents composed of instructions of a computer language having data attributes, comprising:
   means for storing at least one style sheet defining a representation format of delivery contents composed of instructions of a computer language having data attributes;

means for accepting delivery contents composed of instructions of a computer language having data attributes and/or a style sheet;

means for prompting a user to select a stored style sheet;

wherein said means for prompting includes a selection menu item for editing a style sheet; and means for applying the style sheet selected by the user to the delivery contents and displaying the accepted delivery contents.

2. The contents receiving system as set forth in claim 1, wherein said style sheet storing means is a medium that is portable and that is attachable and detachable to/from the main body of the contents receiving system.

3. The contents receiving system as set forth in claim 1, wherein said means for prompting includes a selection menu item that causes delivery contents not to be displayed.

4. The contents receiving system as set forth in claim 1, wherein the style sheet is encrypted, and wherein the contents receiving system further comprises:

means for decrypting an encrypted style sheet.

5. A contents receiving system for receiving delivery contents described in a language format using tags, comprising:

means for storing at least one style sheet defining a representation format of delivery contents described in a language format using tags;

means for accepting delivery contents described in a language format using tags and/or a style sheet;

means for prompting a user to select a stored style sheet;

wherein said means for prompting includes a selection menu item for editing a style sheet; and means for applying the style sheet selected by the user to the delivery contents and displaying the accepted delivery contents.

6. A contents receiving system for receiving delivery contents described in a language format using tags that are freely definable, comprising:

means for storing at least one style sheet defining a representation format of delivery contents described in a language format using tags that are freely definable;

means for accepting delivery contents described in a language format using tags that are freely definable and/or a style sheet;

means for prompting a user to select a stored style sheet;

wherein said means for prompting includes a selection menu item for editing a style sheet; and means for applying the style sheet selected by the user to delivery contents and displaying the accepted delivery contents.

7. A contents receiving method for receiving delivery contents composed of instructions of a computer language having data attributes, comprising the steps of:

storing at least one style sheet defining a representation format of delivery contents composed of instructions of a computer language having data attributes;

accepting delivery contents composed of instructions of a computer language having data attributes and/or a style sheet;

prompting a user to select a stored style sheet;

wherein the prompting step is performed by including a selection menu item that causes a style sheet to be edited; and applying the style sheet selected by the user to the delivery contents and displaying the accepted delivery contents.

8. The contents receiving method as set forth in claim 7, wherein the style sheet storing step is performed by storing the style sheet to a medium that is portable and that is attachable and detachable to/from the main body of a contents receiving system.

9. The contents receiving method as set forth in claim 7, wherein the user selection prompting step is performed by including a selection menu item that causes delivery contents not to be displayed.

10. The contents receiving method as set forth in claim 7, wherein the style sheet is encrypted, and wherein the contents receiving method further comprises the step of:

decrypting an encrypted style sheet.

11. A contents receiving method for receiving delivery contents described in a language format using tags, comprising the steps of:

storing at least one style sheet defining a representation format of delivery contents described in a language format using tags;

accepting delivery contents described in a language format using tags and/or a style sheet;

prompting a user to select a stored style sheet;

wherein the prompting step is performed by including a selection menu item that causes a style sheet to be edited; and applying the style sheet selected by the user to the delivery contents and displaying the accepted delivery contents.

12. A contents receiving method for receiving delivery contents described in a language format using tags that are freely definable, comprising the steps of:

storing at least one style sheet defining a representation format of delivery contents described in a language format using tags that are freely definable;

accepting delivery contents described in a language format using tags that are freely definable and/or a style sheet;

prompting a user to select a stored style sheet;

wherein the prompting step is performed by including a selection menu item that causes a style sheet to be edited; and applying the style sheet selected by the user to delivery contents and displaying the accepted delivery contents.

* * * * *